United States Patent
Norris

(10) Patent No.: US 10,922,073 B2
(45) Date of Patent: *Feb. 16, 2021

(54) DISTRIBUTED INCREMENTAL UPDATING OF TRAYS USING A SOURCE CONTROL SYSTEM

(71) Applicant: ServiceNow, Inc., Santa Clara, CA (US)

(72) Inventor: Jeremy Norris, Poway, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/250,875

(22) Filed: Jan. 17, 2019

(65) Prior Publication Data

US 2019/0227791 A1     Jul. 25, 2019

Related U.S. Application Data

(63) Continuation of application No. 15/491,260, filed on Apr. 19, 2017, now Pat. No. 10,209,983.

(51) Int. Cl.
*G06F 8/658* (2018.01)
*G06F 9/455* (2018.01)
*G06F 9/50* (2006.01)

(52) U.S. Cl.
CPC .............. *G06F 8/658* (2018.02); *G06F 9/455* (2013.01); *G06F 9/505* (2013.01)

(58) Field of Classification Search
CPC . G06F 8/658; G06F 8/68; G06F 9/505; G06F 9/455
See application file for complete search history.

(56) References Cited

U.S. PATENT DOCUMENTS 5,644,768 A    7/1997   Periwal et al.
5,701,480 A   12/1997   Raz
(Continued)

FOREIGN PATENT DOCUMENTS

JP      2000137620 A    5/2000
WO      2008151551 A1   12/2008

OTHER PUBLICATIONS

Rocha et al., "A QoS Aware Non-work-conserving Disk Scheduler", 2012, IEEE (Year: 2012).*

(Continued)

*Primary Examiner* — Wei Y Zhen
*Assistant Examiner* — Junchun Wu
(74) *Attorney, Agent, or Firm* — Fletcher & Yoder PC

(57) ABSTRACT

A source control system is used for the distributed incremental updating of trays that include all of the dependencies needed for an application to execute within a computing environment. An application of a first version of a tray is executed on a server responsive to the first version of the tray being retrieved from a source control system. Tray management software of the first version of the tray receives a request to update the tray to a second version. The tray management software requests a changeset including file differences between the first and second versions of the tray from the source control system. Responsive to a determination by the tray management software that there are no pending requests preventing an update, the tray is updated from the first version to the second version by updating files in the tray according to the changeset.

17 Claims, 9 Drawing Sheets

(56) References Cited

U.S. PATENT DOCUMENTS

| | | | | |
|---|---|---|---|---|
| 6,681,391 | B1* | 1/2004 | Marino | G06F 8/61 |
| | | | | 717/174 |
| 6,832,373 | B2* | 12/2004 | O'Neill | G06F 8/654 |
| | | | | 717/171 |
| 7,089,239 | B1* | 8/2006 | Baer | G06F 16/95 |
| 7,694,293 | B2* | 4/2010 | Rao | G06F 8/65 |
| | | | | 717/170 |
| 7,917,596 | B2* | 3/2011 | Chan | G06F 16/2343 |
| | | | | 717/168 |
| 8,005,792 | B2* | 8/2011 | Green | G06F 16/2329 |
| | | | | 707/638 |
| 8,762,980 | B1* | 6/2014 | Sobel | G06F 8/65 |
| | | | | 717/170 |
| 8,966,464 | B1* | 2/2015 | Christopher | G06F 11/0712 |
| | | | | 717/166 |
| 9,064,120 | B2* | 6/2015 | Satish | G06F 8/61 |
| 10,209,983 | B2* | 2/2019 | Norris | G06F 9/505 |
| 10,261,782 | B2* | 4/2019 | Suarez | G06F 8/71 |
| 2003/0182414 | A1* | 9/2003 | O'Neill | G06F 9/3004 |
| | | | | 717/170 |
| 2004/0215755 | A1* | 10/2004 | O'Neill | G06F 8/654 |
| | | | | 717/170 |
| 2006/0004886 | A1 | 1/2006 | Green et al. | |
| 2006/0074712 | A1 | 4/2006 | Joregensen et al. | |
| 2006/0271924 | A1* | 11/2006 | Calcaterra | G06F 8/61 |
| | | | | 717/168 |
| 2006/0282479 | A1 | 12/2006 | Johnson et al. | |
| 2007/0118572 | A1* | 5/2007 | Fischer | G06F 16/2358 |
| 2008/0120297 | A1* | 5/2008 | Kapoor | G06F 16/2308 |
| 2008/0301668 | A1* | 12/2008 | Zachmann | G06F 8/656 |
| | | | | 717/173 |
| 2015/0058834 | A1* | 2/2015 | Chan | H04L 67/327 |
| | | | | 717/169 |
| 2016/0026442 | A1 | 1/2016 | Chhaparia | |
| 2016/0094502 | A1* | 3/2016 | Pollack | H04L 12/6418 |
| | | | | 726/4 |
| 2016/0098265 | A1* | 4/2016 | Mahajan | H04L 67/34 |
| | | | | 717/170 |
| 2016/0182315 | A1* | 6/2016 | Salokanto | H04L 41/5054 |
| | | | | 709/226 |
| 2016/0275130 | A1* | 9/2016 | O'Reilly | G06F 16/23 |
| 2017/0060570 | A1* | 3/2017 | Miller | G06F 8/71 |
| 2017/0090960 | A1 | 3/2017 | Anderson et al. | |
| 2017/0131994 | A1* | 5/2017 | Middleton | G06F 8/65 |
| 2017/0180346 | A1* | 6/2017 | Suarez | G06F 9/45558 |
| 2017/0206123 | A1* | 7/2017 | Kirkpatrick | G06F 9/44521 |
| 2018/0088926 | A1* | 3/2018 | Abrams | H04L 67/34 |

OTHER PUBLICATIONS

Nahabedian et al., "Assured and Correct Dynamic Update of Controllers", May 2016, ACM (Year: 2016).*

Ganger et al., "Soft Updates: A Solution to the Metadata Update Problem in File Systems", May 2000, ACM, vol. 18, No. 2, pp. 127-153 (Year: 2000).*

Mershad et al., "SSUM: Smart Server Update Mechanism for Maintaining Cache Consistency in Mobile Environments", Jun. 2010, IEEE, vol. 9, No. 6 (Year: 2010).*

Xue et al., "An Exclusive Version Locking Scheme in Internet-based Real-time Group Editors", 2003, IEEE (Year: 2003).*

Anonymous: "Docker (software)—Wikipedia"; Apr. 14, 2017 (Apr. 14, 2017), pp. 1-89, XP055505434; retrieved from Internet: URL: https://en.wikipedia.org.w.index.php?title=Docket_(software)&oldid=775376608, retrieved on Sep. 7, 2018.

Janicke et al., "Concurrent Enforcement of Usage Control Policies", 2008, IEEE (Year: 2008).

Smith et al., "Transparent Concurrent Execution of Mutually Exclusive Alternatives", 1989, IEEE (Year: 1989).

Cribbs, Bob, "Vagrant—Version control your dev environment", Brasov Tech Meet, Sep. 2013, http://www.slideshare.net/bocribbz/vagrant-version-control-your-dev-environment-27 466406, Downloaded Feb. 17, 2017, 42 pp.

Heroku Dev Center, "Deploying with Git", last updated Feb. 7, 2017, https://devcenter.heroku.com/articles/git, 4 pp.

Octopus Deploy Documentation, "Packaging Applications", https://octopus.com/docs/packaging-applications, Date Unknown, Downloaded Feb. 17, 2017, 2 pp.

Hashicorp, "Vagrant—Docker Provisioner", Date Unknown, https://www.vagrantup.com/docs/provisioning/docker.html, Downloaded Feb. 17, 2017, 5 pp.

docker. com, "Modern App Architecture for the Enterprise", Delivering Agility, portability and control with Docker Containers as a Service (CaaS), https://www.docker.com/sites/default/files/caaSwhitepaper_V6_0.pdf, Date Unknown, Downloaded Feb. 17, 2017, 8 pp.

Sorens, M., "Creating Tray Applications in .NET: A Practical Guide", redgate Hub, https://www.red-gate.com/simple-talk/dotnet/net-framework/creating-tray-applications-in-net-a-pratical-guide/, Nov. 4, 2010 (Apr. 11, 2010).

Office Action for Canadian Patent Application No. 2999663 dated Jan. 15, 2019; 8 pgs.

* cited by examiner

DISTRIBUTED INCREMENTAL UPDATING OF TRAYS USING A SOURCE CONTROL SYSTEM

CROSS REFERENCE TO RELATED APPLICATIONS

The present application is a continuation of U.S. patent application Ser. No. 15/491,260, filed on Apr. 19, 2017, entitled, "DISTRIBUTED INCREMENTAL UPDATING OF TRAYS USING A SOURCE CONTROL SYSTEM", which is herein incorporated by reference.

BACKGROUND

An electronic computing and communications system can process information using servers operating at a datacenter. The servers can execute software for implementing aspects of the functionality of the electronic computing and communications system. The software can be updated to change the functionality of the electronic computing and communications system, such as by updating instructions or dependencies of the software.

SUMMARY

Disclosed herein are implementations of systems and techniques for distributed incremental updating of trays using a source control system.

In an implementation, a system is provided for distributed incremental updating of trays using a source control system. The system comprises a memory and a processor. The memory includes instructions executable by the processor to execute an application of a first version of a tray on a server. The tray includes all dependencies needed for executing the application within a computing environment. The memory further includes instructions executable by the processor to receive, by tray management software of the first version of the tray, a request to update the tray to a second version. The memory further includes instructions executable by the processor to request, from the source control system, a changeset including one or more file differences between the first version and the second version. The memory further includes instructions executable by the processor to, responsive to a determination by the tray management software that there are no pending requests preventing an update, update the tray from the first version to the second version by updating files in the tray according to the changeset.

In an implementation, a method is provided for distributed incremental updating of trays using a source control system. The method comprises executing an application of a first version of a tray on a server. The tray includes all dependencies needed for executing the application within a computing environment. The method further comprises receiving, by a management software of the first version of the tray, a first request to update the tray to a second version. The method further comprises requesting, from the source control system, a changeset including one or more file differences between the first version and the second version. The method further comprises, responsive to a determination by the management software that there are no pending requests preventing an update, updating the tray from the first version to the second version by updating files in the tray according to the changeset.

In an implementation, a non-transitory computer-readable storage medium is provided. The non-transitory computer-readable storage medium comprises processor-executable routines that, when executed by a processor, facilitate a performance of operations. The operations comprise receiving a request for a function of an application programming interface (API) of tray management software, the tray management software included in a first version of a tray installed on a server. The operations further comprise executing the function against the tray to update the tray from the first version to a second version using a changeset retrieved from a source control system in communication with the server.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
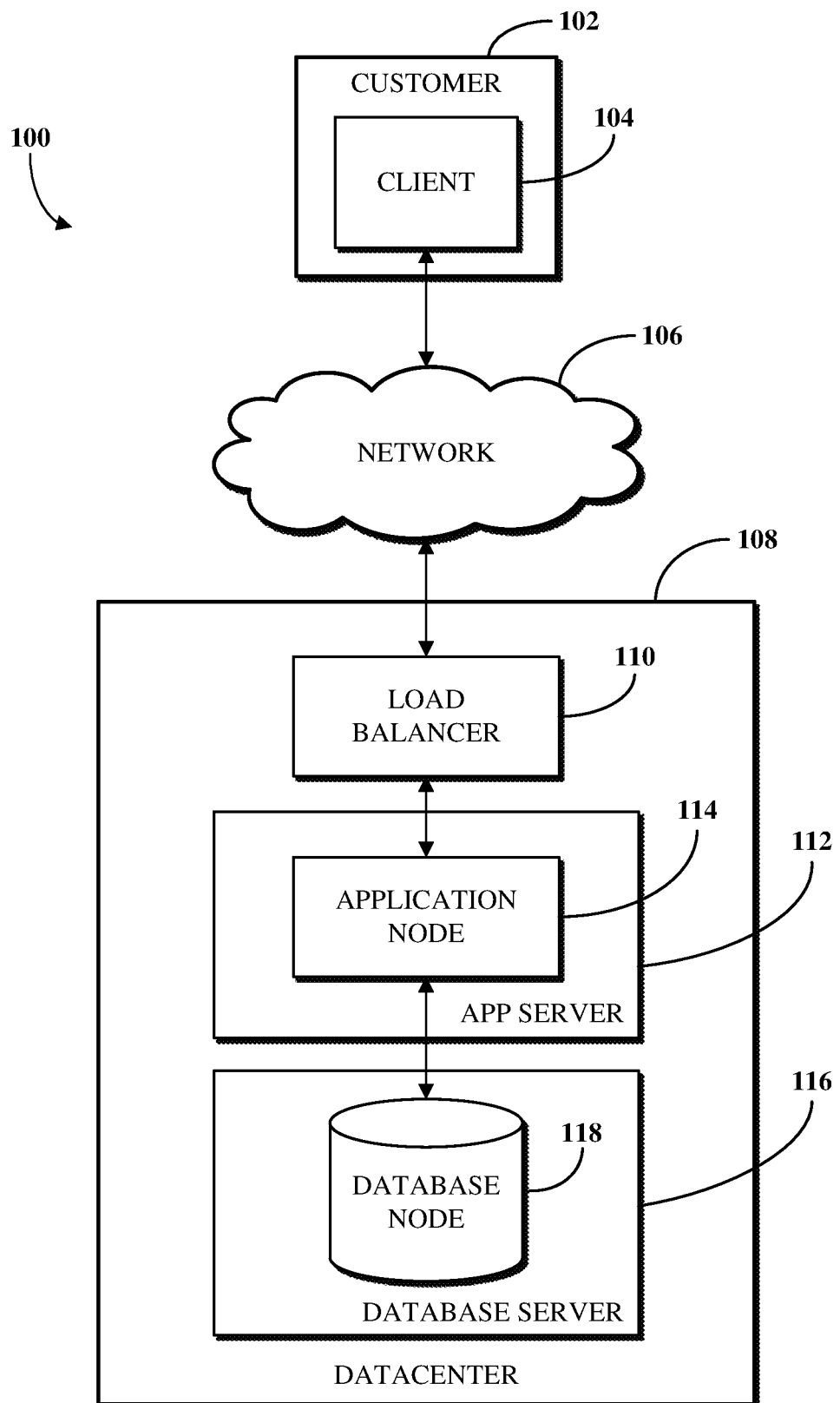
FIG. 1 is a block diagram of an example of an electronic computing and communications system.

Instances of applications executing on servers at a datacenter can be provisioned using trays. A tray can be implemented as a container that includes instructions for executing an application and dependencies needed by the application to execute within a computing environment. For example, a tray can include runtime dependencies, libraries, system files, other components, or a combination thereof. A tray can be installed onto a server at a datacenter to execute an instance of an application associated with the tray. As such, trays can be portable, self-contained mechanisms that can be used to execute applications on a computing device.

Customers of a computing (e.g., Platform-as-a-Service (PaaS)) provider can develop software using computing resources, such as instances of configurable platform software provisioned by the computing provider. Functionality of the platform software can be implemented by applications made available to the customers using trays installed on servers controlled by the computing provider. The computing provider can manage the installation of the trays on servers for use by its customers. For example, the instances of platform software configured by individual customers of the computing provider may require different trays to be installed, or may require that different versions of the applications be executed (e.g., where different versions of the platform software available to the customers use different versions of the applications associated with the trays).

An administrator or like operator of the computing provider may update the trays, such as to change the functionality of the customers' platform software. For example, an application of a tray used by the platform software may be developed by a third-party. When the third-party developer releases patches or plug-ins for the application, the administrator or like operator of the computing provider may apply those changes to the application to update the tray from a first version to a second version.

The different versions of the tray may be stored within a source control system. The different versions of tray may require different components, such as dependencies, for the respective applications thereof to be executed. The source control system can maintain records of the dependencies needed by respective versions of the various applications. As such, there may be multiple trays associated with an application. For example, a first set of components used to execute an application may be stored in a first version of a tray, and a second set of components used to execute the application may be stored in a second version of the tray.

It may be desirable to incrementally update the trays used by the instances of platform software. There may be thousands of customers of a computing provider, and each customer may use one or more applications associated with trays used by the platform software. Updating a tray may cause an application thereof to not function as intended, such as by undesirably changing the functionality of the application or by causing errors with respect to the dependencies thereof. The subsequent process to remediate those errors can be time-consuming, such as where the update is performed for a large number of instances of platform software.

Furthermore, it may be desirable to perform the incremental updates in a distributed manner, such as by using software installed on individual servers to pull data for performing the update from a central source. Updating the application and/or components of a tray may involve taking servers offline while the update is being processed. The update may be pushed from a centralized system that that manages the servers. However, the centralized system may not be able to determine an optimal time at which to push the update to the multiple servers. For example, each of the servers may instantiate a different number of platform software instances at different times.

Implementations of this disclosure address problems such as these using distributed incremental updates to trays installed on servers. Trays can be stored in a source control system accessible by management software executing on a server. For example, the management software can transmit a request to the source control system for a version of a tray. The software can retrieve the requested tray from the source control system and then install it on the server to execute the application associated with the tray. The application of a first version of a tray can be executed after the first version of the tray is retrieved from the source control system. The tray management software of the first version of the tray can then receive a request to update the tray to a second version, such as from a shell of a client in communication with the server on which the application is executed. The tray management software can request a changeset including file differences between the first and second versions of the tray from the source control system. Once a determination is made that there are no pending requests preventing an update, the tray can be updated from the first version to the second version by updating files in the tray according to the changeset. The request to update the tray can be handled by a function of an application programming interface (API) of the tray management software such that a tray can be updated based on the execution of a call to the API of the tray management software.

Implementations of this disclosure provide technological improvements particular to computer networks, for example, those concerning the updating of trays used to execute applications on servers. Computer network-specific technological problems, such as the distributed updating of the trays, can be wholly or partially solved by implementations of this disclosure. For example, a tray can include tray management software having an API with functions for updating the tray. A request for a function of the API to update the tray to a different version can be received and executed, such as by retrieving a changeset indicative of the file differences between the current and different versions of the tray from a source control system. The implementations of this disclosure introduce new and efficient improvements in the ways in which distributed updates of trays can be performed. For example, a tray installed on a server can be updated from a first version to a second version without first uninstalling the tray from the server and without receiving instructions from a centralized update mechanism.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as a database node 118 executing on the database server 116.

The application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as the database node 118, which can be accessible by software executed on the application node 114. A database implemented by the database node 118 may be a relational database management system (RDBMS), an object database, an XML database, a configuration management database (CMDB), a management information base (MIB), one or more flat files, other suitable non-transient storage mechanisms, or a combination thereof. By way of non-limiting example, the system 100, in some implementations, can include an XML database and a CMDB. While limited examples are described, a database implemented using the database node 118 can be configured as or comprise any suitable database type. Further, the system 100 can include one, two, three, or any suitable number of databases configured as or comprising any suitable database type or combination thereof.

In some implementations, a database implemented using the database node 118 can be configured as or comprise a CMDB. A CMDB can comprise a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database node 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., implemented using the database node 118), tables, other suitable information sources, or portions or combinations thereof may be stored, managed, or otherwise provided by one or more of the elements of the system 100 other than the database server 116, such as the client 104 or the application server 112.

In some implementations, a customer instance, which may also be referred to as an instance of platform software, can be implemented using one or more application nodes 114 and one or more database nodes 118. For example, the one or more application nodes 114 can implement a version of the platform software, and databases implemented by the one or more database nodes 118 can store data used by the version of the platform software. The customer instance associated with the customer 102 may be different from a customer instance associated with another customer. For example, the one or more application nodes and databases used to implement the platform software and associated data of a first customer may be different from the one or more application nodes and databases used to implement the platform software and associated data of a second customer. In some implementations, multiple customer instances can use one database node 118, such as wherein the database node 118 includes separate catalogs or other structure for separating the data used by platform software of a first customer and platform software of a second customer.

Some or all of the systems and methods described herein can operate or be executed on or by the servers associated with the system 100. For example, software of a tray can be installed on a server at the datacenter 108, such as a server on which one or more of the application server 112 or the database server 116 operates. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as implemented by the database node 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a software service to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, which can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
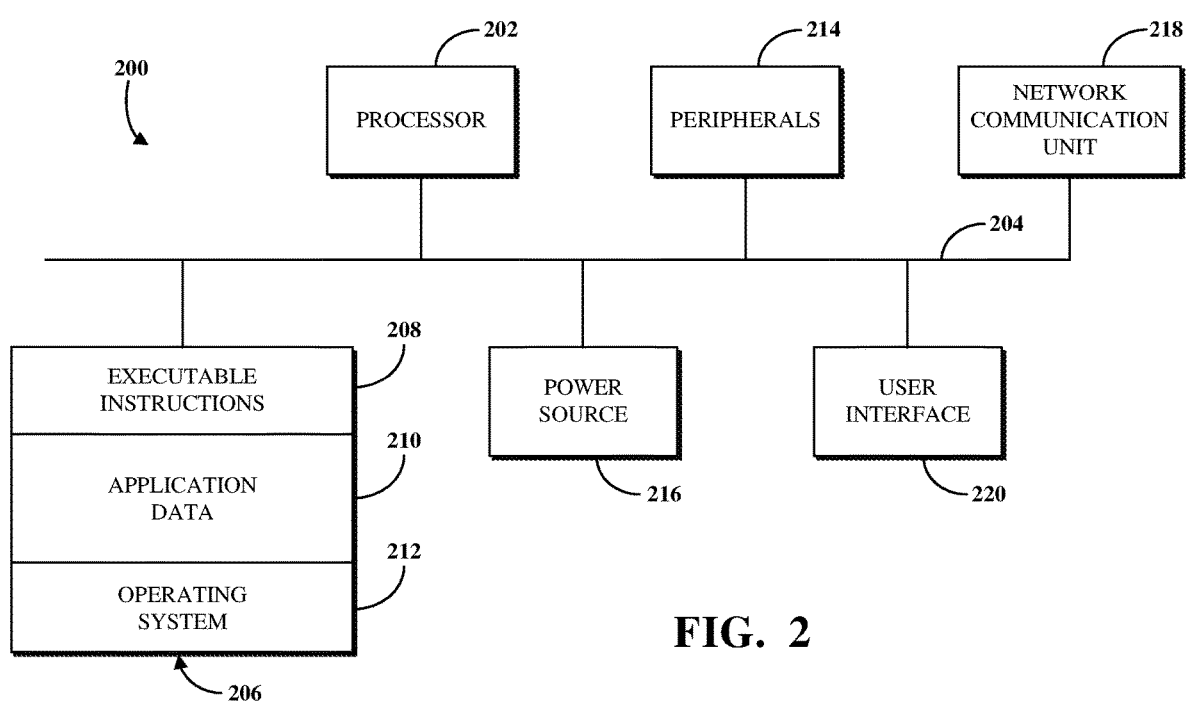
FIG. 2 is a block diagram of an example internal configuration of a computing device of an electronic computing and communications system.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to update trays according to changesets including file differences between different versions of the tray.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®; an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
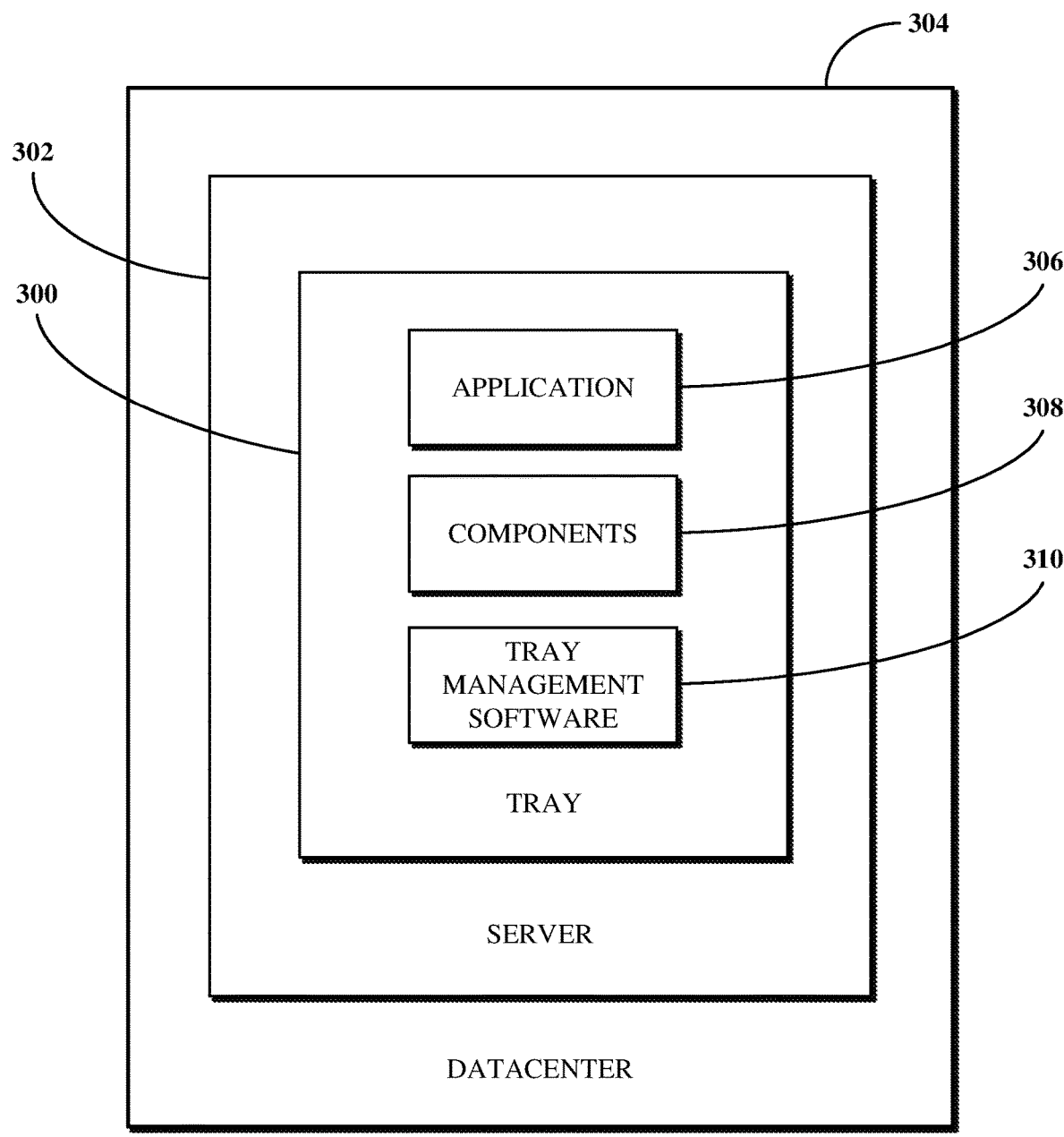
FIG. 3 is a block diagram of an example of a tray installed on a server at a datacenter.

FIG. 3 is a block diagram of an example of a tray 300 installed on a server 302 at a datacenter 304. The datacenter 304 can be the datacenter 108 shown in FIG. 1. The server 302 is a computing device, such as the computing device 200 shown in FIG. 2. The tray 300 includes an application 306, components 308, and tray management software 310.

As described later with respect to FIG. 4, the tray 300 can be installed on the server 302 after it is retrieved, such as from a source control system.

The application 306 is an application executable on the server 302. The application 306 can include executable instructions that, when executed by a processor of the server 302, cause the application 306 to run. Alternatively, the application can include interpretable instructions that, when interpreted (e.g., using an interpreter included in the tray 300), cause the application 306 to run. The application 306 may be an application used to provision functionality of platform software. For example, the application 306 can be MySQL management software, such as for managing a database implemented by a database node (e.g., the database node 118 shown in FIG. 1). Alternatively, the application 306 may be an application developed on or using platform software. For example, the application 306 can be a plug-in for adding functionality to the platform software.

The components 308 include components, such as dependencies, that are needed by the application 306 to execute the application 306 within a computing environment. The components 308 can include compilers, interpreters, or like software for causing instructions of the application 306 to run. For example, where the application 306 includes Ruby code, the components 308 can include a Ruby interpreter. The components 308 can include runtime data, processes, routines, or the like used by the application 306, such as within the computing environment.

One example of a computing environment may relate to an operating system executing on the server 302. For example, where the server 302 includes a particular build of a Linux® operating system, the components 308 can include system tools, libraries, or the like for executing the application 306 within that Linux®-build. Different trays may include different components used to execute the same application within multiple computing environments. For example, first and second trays may both include the same MySQL management software as the application 306. However, the components of the first tray may relate to a Linux® operating system, whereas the components of the second tray may relate to a Windows® operating system.

The tray management software 310 includes functionality for managing the tray 300. For example, the tray management software 310 can include functionality for updating the tray 300, such as based on changes to the components 308. The tray management software 310 can be or otherwise include an API having functions executable against the tray 300 and/or its constituents, for example, the application 306 or the components 308. As will be discussed below, the tray management software 310 may include functionality for transmitting or receiving requests between the tray 300 and other aspects of an electronic computing and communications system (e.g., the electronic computing and communications system 100 shown in FIG. 1).

Implementations of the tray 300 of FIG. 3 can include additional, less, or combined functionality as compared to that described above, or functionality other than that described above, or combinations thereof. In some implementations, there may be multiple trays installed on the server 302. For example, each tray installed on the server 302 can include separate ones of an application, components, and a tray management software. In some implementations, there may be multiple servers at the datacenter 304. For example, each of those servers may have one or more trays installed thereon.

Figure 4:
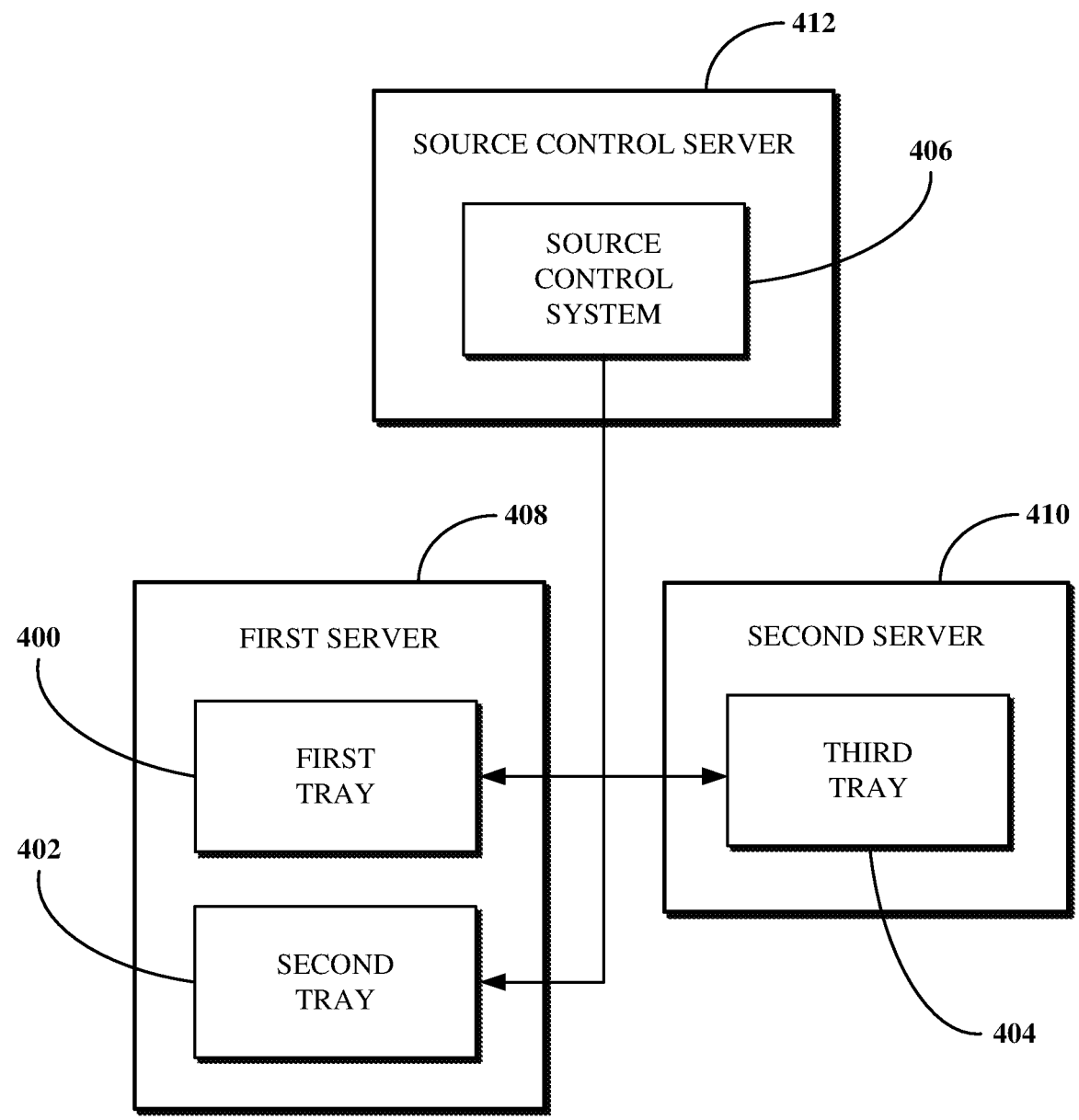
FIG. 4 is a block diagram of an example of trays received from a source control system.

FIG. 4 is a block diagram of an example of trays 400, 402, and 404 received from a source control system 406. A first tray 400 and a second tray 402 are installed on a first server 408. A third tray 404 is installed on a second server 410. The source control system 406 operates on a source control server 412. One or more of the first server 408, the second server 410, or the source control server 412 can be the server 302 shown in FIG. 3. For example, the first server 408, the second server 410, and the source control server 412 can be separate servers operating at one or more datacenters, such as the datacenter 304 shown in FIG. 3.

The source control system 406 is a version control system including repositories for storing versions of trays. A repository can include files associated with one or more versions of a tray. For example, the trays 400, 402, and 404 can be respectively stored in first, second, and third repositories of the source control system 406. The first repository can include first and second versions of the first tray 400. The second repository can include a first version of the second tray 402. The third repository can include first, second, third, and fourth versions of the third tray 404. The repository associated with a tray can store any number of versions of that tray (subject, for example, to technical limitations of the source control system 406 or other computational aspects involved in operating the source control system 406).

The trays 400, 402, and 404 can be installed on the first and second servers 408 and 410 after being retrieved from the source control system 406. For example, as described later with respect to FIG. 5, the first server 408 can include management software for retrieving the first tray 400 from the source control system 406 and installing same on the first server 408. Retrieving a tray from the source control system 406 may include Retrieving a tray from the source control system 406 may alternatively include transmitting a request for the tray to the source control system 406 and the source control system 406 deploying or otherwise transmitting the tray to the server responsive to that request. An application of the first tray 400 (e.g., the application 306 shown in FIG. 3) can be executed on the first server 408 after the first tray 400 is installed thereon.

Implementations of the trays 400, 402, and 404 and the source control system 406 of FIG. 4 can include additional, less, or combined functionality as compared to that described above, or functionality other than that described above, or combinations thereof. In some implementations, the first tray, 400, the second tray 402, and the third tray 404 can be installed onto one server (e.g., one of the first server 408 or the second server 410). In some implementations, one or both of the first server 408 or the second server 410 can have any number of trays installed thereon (subject, for example, to technical limitations of such servers or other computational aspects involved in using the trays). In some implementations, the source control server 412 can be omitted. For example, the source control system 406 can operate on a same server on which one or more of the first tray 400, the second tray 402, or the third tray 404 is installed.

Figure 5:
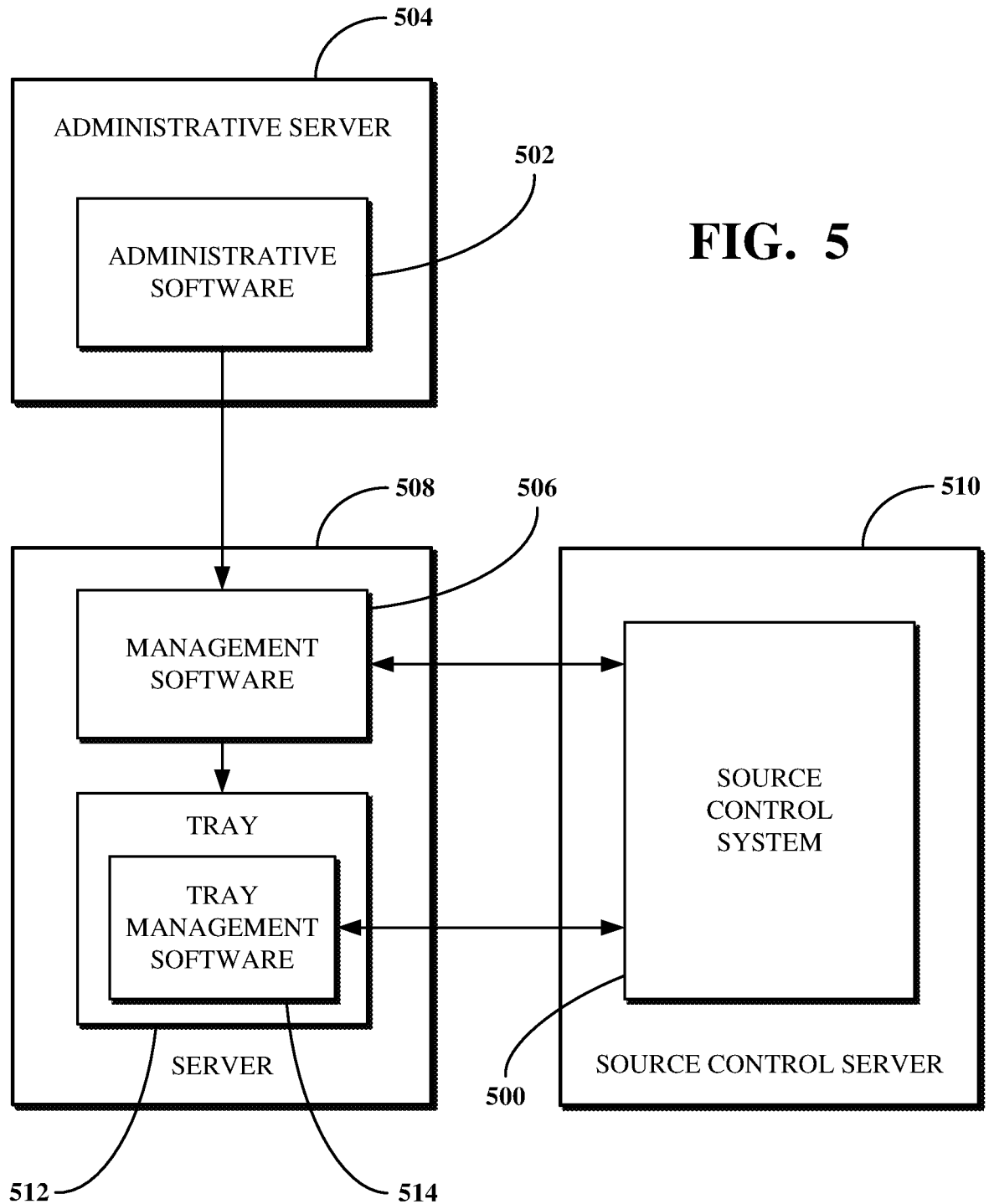
FIG. 5 is a block diagram of an example of a system for distributed incremental updating of trays using a source control system.

FIG. 5 is a block diagram of an example of a system for distributed incremental updating of trays using a source control system 500. The system includes administrative software 502 installed on an administrative server 504, management software 506 installed on a server 508, and the source control system 500 operating on a source control server 510. The source control system 500 and the source control server can respectively be, for example, the source control system 406 and the source control server 412 shown in FIG. 4. The server 508 can be, for example, one of the first server 408 or the second server 410 shown in FIG. 4. The administrative server 504 and the source control server 510 are computing devices, such as the computing device 200 shown in FIG. 2.

The administrative software 502, the management software 506, and the source control system 500 can be used to install a tray 512 (e.g., one of the first tray 400, the second tray 402, or the third tray 404 shown in FIG. 4) on the server 508. For example, as will be described below, the tray 512 can be installed on the server 508 responsive to a request transmitted from the administrative software 502. The tray 512 may later be updated while remaining installed on the server 508, for example, using data retrieved from the source control system 500 by tray management software 514 (e.g., the tray management software 310 shown in FIG. 3) of the tray 512. Accordingly, the installation and subsequent update of the tray 512 are performed in a distributed fashion onto and from the server 508, rather than from a centralized source.

The administrative software 502 is an application for managing servers operating at a datacenter. The administrative software 502 can be or otherwise include an API having functions for introducing the functionality of server 508 for installing and subsequently updating the tray 512. The API of the administrative software 502 can include a function for installing the management software 506 onto the server 508. A user of the administrative software 502, such as an administrator or like user of the server 508, can enter a command including parameters for executing a function of the API of the administrative software 502, such as in a terminal of a client device in communication with the administrative server 504. Alternatively, a script automation running on the server 508 can generate the command. The administrative software 502 can cause the management software 506 to be installed on the server 508 responsive to the command.

The management software 506 is an application for managing installations of trays on the server 508. The management software 506 can be or otherwise include an API having functions for retrieving trays from the source control system 500 and installing the retrieved trays on the server 508. Alternatively, the management software 506 can include backend functionality for retrieving trays from the source control system 500 and installing the retrieved trays on the server 508, such as where functions of the management software 506 are not selectively executed by an administrator or like user of the server 508.

For example, the administrative software 502 may further include functionality for transmitting instructions to the management software 506. The instructions can include instructions for retrieving respective ones of the trays stored in the source control system 500 therefrom. The instructions can further include instructions for installing the retrieved trays on the server 508. The management software 506 can process those instructions received from the administrative software 502 without further user intervention.

For example, the administrative software 502 can transmit instructions (e.g., based on user input received, for example, as a command from a client terminal) to the management software 506 for the management software 506 to retrieve the tray 512 from the source control system 500. Responsive to those instructions, the management software 506 can transmit a request for a particular version of the tray 512 to the source control system 500. Responsive to that request, the source control system 500 can deploy an installable object for the requested version of the tray 512 to the server 508. The management software 506 can then install the tray 512 using the deployed object.

As will be described later with respect to FIG. 7, the tray 512 can be updated, such as by updating files of the tray 512 (e.g., the application 306 and/or the components 308 shown in FIG. 3). Updating the tray 512 can include the tray management software 514 transmitting a request for a changeset to the source control system 500. The changeset can include one or more file differences between the current version of the tray 512 and the version to which to update the tray 512. The tray management software 514 can use the changeset received from the source control system 500 to update the tray 512.

Updating the tray 512 can include upgrading a current version of the tray to a newer version (e.g., updating the tray 512 from version 2.0 to version 3.0), downgrading the current version to an earlier version (e.g., updating the tray 512 from version 2.0 to version 1.0), applying a patch or a plugin to update some of the files of the tray 512 (e.g., updating the tray 512 from version 2.0 to version 2.1), or the like.

Updating an application of the tray 512 can include making changes to files associated with functionality of the application (e.g., C++ source code files, Java Archive (JAR) files, or the like). The application can include core functionality and extensible functionality. For example, the application may by default include certain functionality and may have customizations added thereto, such as specific to a computing environment in which the application executes, the needs of a customer using the application, other purposes, or combinations thereof. An update to the application of the tray 512 can therefore include updating files associated with the core functionality, the extensible functionality, plugins that add further functionality, or the like, or combinations thereof.

Updating components of the tray 512 can include making changes to files associated with dependencies used by an application of the tray 512 to execute in a computing environment. For example, the components may include libraries used by the application, such as to implement core or extensible functionality of the application. Changes can be made to those libraries to cause such application functionality to update. In another example, the components may include system tools or the like related to the computing environment of the application (e.g., an operating system of the server 508). Changes can be made to those tools to update compatibility of the application with the computing environment. An update to the components of the tray 512 can therefore include updating files associated with functionality of the application of the tray 512, the computing environment in which the application executes, or the like, or combinations thereof.

Implementations of the system of FIG. 5 can include additional, less, or combined functionality as compared to that described above, or functionality other than that described above, or combinations thereof. In some implementations, the administrative server 504, the server 508, and the source control server 510 can operate at one or more datacenters, such as the datacenter 304 shown in FIG. 3. For example, all three of the administrative server 504, the server 508, and the source control server 510 can operate at one datacenter. In another example, one of the administrative server 504, the server 508, or the source control server 510 can operate at one datacenter and the other two can operate at another datacenter. In another example, each of the administrative server 504, the server 508, and the source control server 510 can operate at different datacenters.

In some implementations, one or both of the administrative server 504 or the source control server 510 can be omitted. For example, the administrative software 502 can be installed on the source control server 510. In such implementations, the administrative server 504 can be omitted. In another example, the source control system 500 can operate on the administrative server 504. In such implementations, the source control server 510 can be omitted. In yet another example, the administrative software 502 can be installed and/or the source control system 500 can operate on the server 508. In such implementations, the administrative server 504 and the source control server 510 can be omitted.

In some implementations, the administrative software 502 and the administrative server 504 can be omitted. For example, the management software 506 can use an interface of the server 508 to receive commands for retrieving versions of the trays from the source control system 500 and installing same on the server 508 directly from a client terminal. The management software 506 can be installed on the server 508 by default or after an event, for example, a reset or powering on of the server 508.

Figure 6:
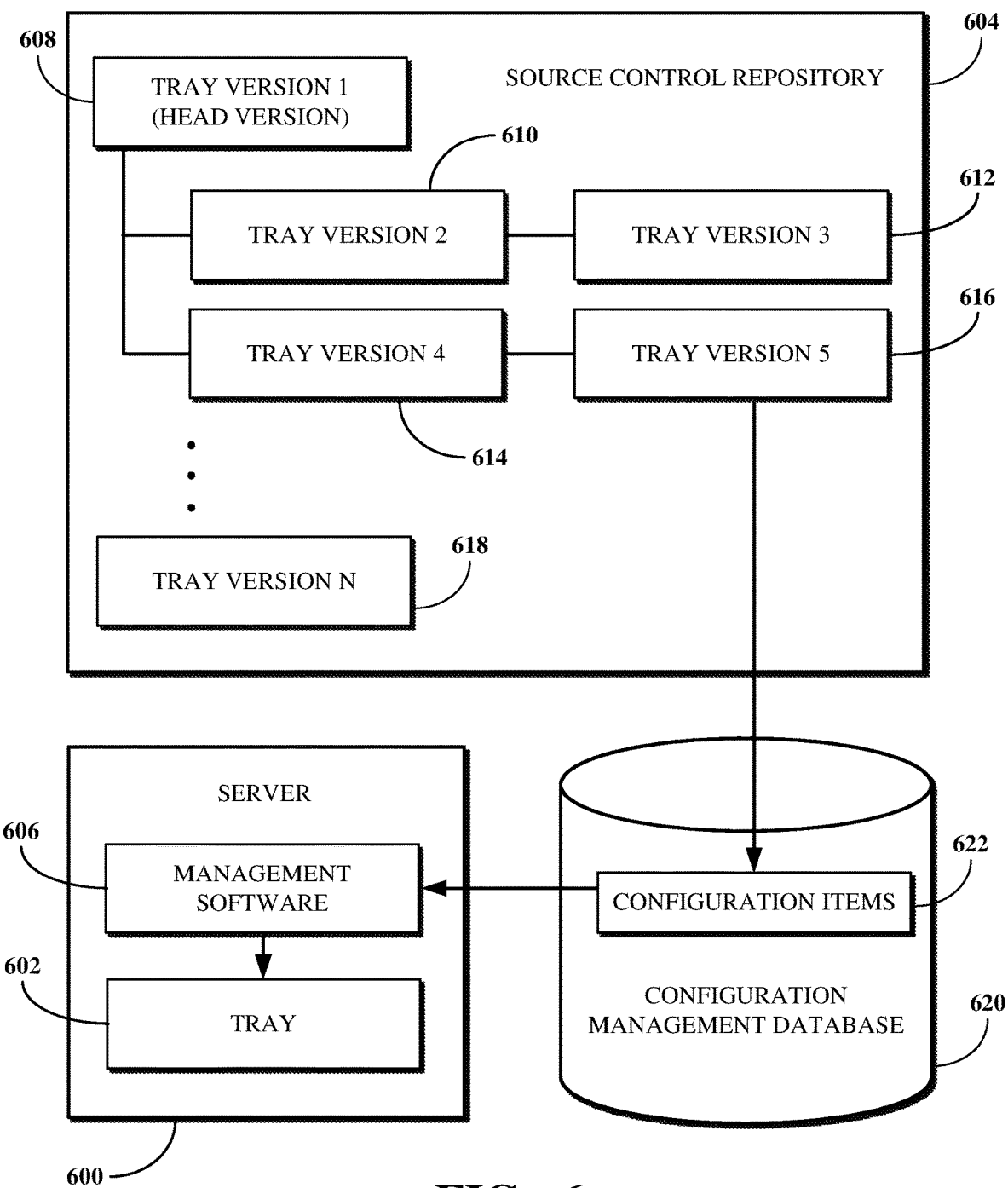
FIG. 6 is a block diagram of an example of a server receiving a version of a tray from a source control repository.

FIG. 6 is a block diagram of an example of a server 600 receiving a version of a tray 602 from a source control repository 604. The server 600 and the tray 602 can respectively be, for example, the server 508 and the tray 512 shown in FIG. 5. The source control repository 604 can be, for example, a repository of the source control system 500 shown in FIG. 5. The server 600 can include management software 606 for receiving and installing the version of the tray 602. The management software 606 can be, for example, the management software 506 shown in FIG. 5.

The source control repository 604 can store different versions of the tray in branches. The branches can be organized according to a parent-child hierarchy. For example, as shown in the figure, version 1 608, also referred to as a head version 608, is the parent of the branch that includes version 2 610, version 3 612, version 4 614, and version 5 616. The version 2 610 is a child of the version 1 608 and a parent of the version 3 612. Similarly, the version 4 614 is a child of the version 1 608 and a parent of the version 5 616. The source control repository 604 can include other versions of the tray 602, such as the version N 518, which is not directly related to the version 1 608, the version 2 610, the version 3 612, the version 4 614, or the version 5 618.

A branch of the source control repository 604 can be a production branch or a non-production (e.g., development, test, or the like) branch. For example, the branch including the version 2 610 and the version 3 612 can be a non-production branch and the branch including the version 4 614 and the version 5 616 can be a production branch. For example, the version 2 610 may correspond to the version 4 614, such as where the version 2 610 is a development version of the tray and the version 4 614 is a production version thereof including the same or similar application and components.

The management software 606 of the server 600 can retrieve a version of the tray 602 from the source control repository 604 using a CMDB 620. The application and components (e.g., the application 306 and the components 308 shown in FIG. 3) of a version of the tray 602 can be represented using CIs of the CMDB 620. As shown in the figure, the version 5 616 of the tray 612 is being retrieved from the source control repository 604. The application and components of the version 5 616 are represented in the CMDB 620 by the CIs 622. The source control repository 604 can transmit an indication that the version 5 616 has been selected to the CMDB 620 (e.g., to software for managing the CMDB). The CMDB 620 can use the transmitted indication to identify the CIs 622. The application and components associated with the version 5 616 of the tray 602 can thus be identified based on the CIs 622.

Information about the CIs 622 can be transmitted from the CMDB 620 to the management software 606. For example, the management software 606 can use the transmitted information to identify network locations from which to download or otherwise retrieve the application and components represented by the CIs 622. After downloading or otherwise retrieving the application and components, the management software 606 can install the version 5 616 of the tray 602 onto the server 600.

A request to update the installed version of the tray 602 can be responsive to a change in a version of a CI associated with the server 600. For example, if a change is made to the computing environment in which an application of the tray 602 executes, the dependencies included in the tray 602 for executing the application may need to be updated. Changes made to the computing environment that may cause a request to update the installed version of the tray 602 to be generated may include changes to the hardware aspects of the server 600; the operating system installed on the server 600; system libraries or tools used by the operating system, system daemons, or the like; other software aspects of the server 600; or a combination thereof.

For example, a change to a hardware or software aspect of the server 600 can be identified, such as responsive to a discovery operation performed against the server 600. For example, the results of the discovery operation can indicate a change in status to known aspects of the server 600, an identification of new aspects of the server 600 (e.g., which have not been previously discovered or otherwise identified), other changes, or a combination thereof. The results of the discovery operation can be processed against the CMDB 620, such as to update certain CIs of the CMDB 620 according to those results. The management software 606 can receive data indicating that the updated CIs are associated with the server 600. The management software 606 can use that data to generate a request to update the tray 602, which request can be received by tray management software of the tray 602.

Implementations of the receiving of a version of the tray 602 of FIG. 6 can include additional, less, or combined functionality as compared to that described above, or functionality other than that described above, or combinations thereof. In some implementations, the CMDB 620 can be omitted. In such implementations, the management software 606 may, for example, retrieve a particular version of the tray 602 directly from the source control system that includes the source control repository 604.

In some implementations, the CMDB 620 can be used to identify a most recently committed production version of the tray 602. For example, the CIs 622 can indicate up-to-date information for the application or components of a version of the tray 602. The up-to-date information can be compared to the contents of the versions of the tray 602 stored in the source code repository 604. Based on the comparison, a version of the tray 602 that includes the most application or components that correspond to the up-to-date information can be identified.

Figure 7:
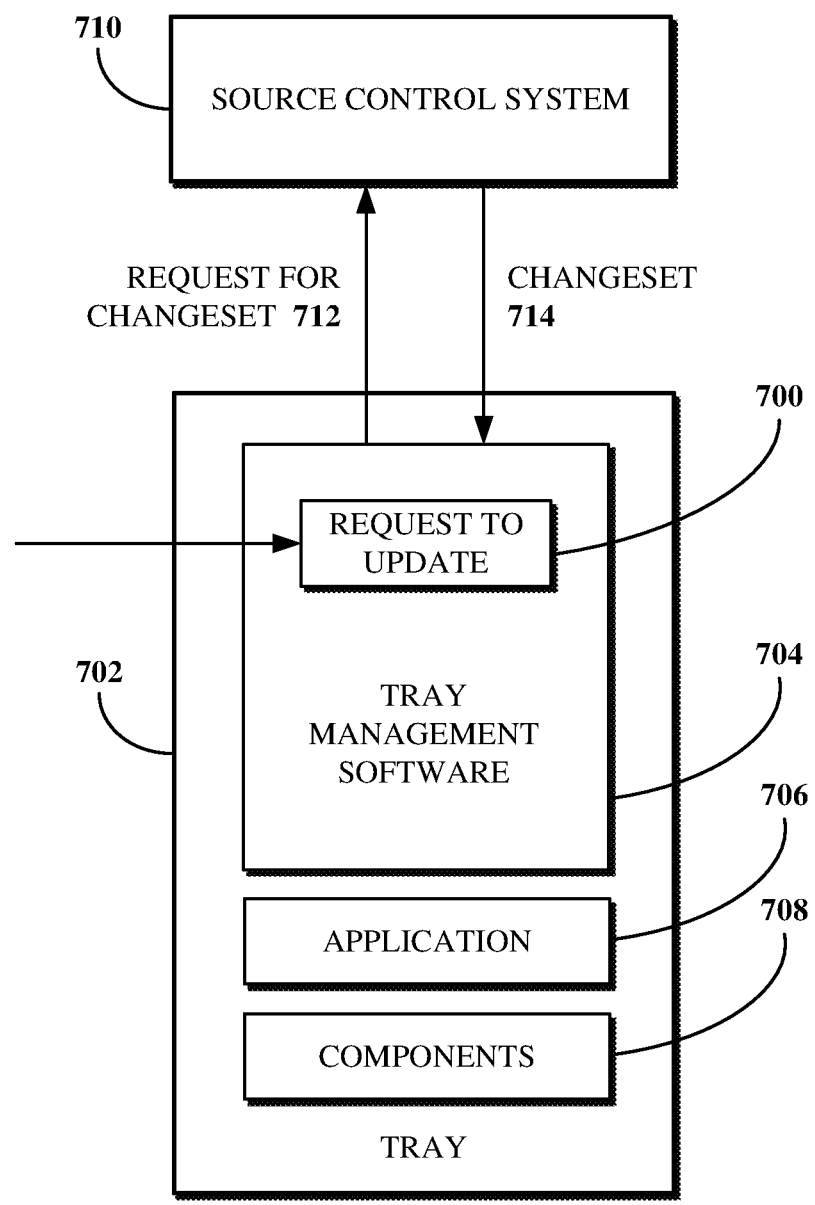
FIG. 7 is a block diagram of an example of a request to update a version of a tray.

FIG. 7 is a block diagram of an example of a request 700 to update a version of a tray 702. The tray 702 can be the tray 512 shown in FIG. 5. The tray 702 is a first version of a tray installed on a server, for example, the server 508 shown in FIG. 5. They tray 702 includes tray management software 704, an application 706, and components 708. The tray management software 704 may be, for example, the tray management software 514 shown in FIG. 5. The application 706 and the components 708 may respectively be, for example, the application 306 and the components 308 shown in FIG. 3.

The application 706 is executed on the server on which the tray 702 is installed. The components 708 include all dependencies needed to execute the application 706 within a computing environment associated with the server. The tray 702 is self-contained in that executing the application 706 on the server does not require using any dependencies or other components not already included in the tray 702. After the execution of the application 706 on the server, the request 700 is received by the tray management software 704. The request 700 can be transmitted from management software installed on the server (e.g., the management software 506 shown in FIG. 5). For example, the request 700 can be a request to execute a function of an API of the tray management software 704, for example, to update one or both of the application 706 or the components 708.

The request 700 can be a request to update the tray 702 from the first version to a second version. For example, the second version of the tray 702 can include one or more components that differ from the components 708. The tray management software 704 can communicate with a source control system 710 to process the request 700. The source control system 710 can be, for example, the source control system 500 shown in FIG. 5. For example, the tray management software 704 can transmit a request for a changeset 714 to the source control system 710. The requested changeset includes file differences between the first version of the tray 702 (e.g., the version installed at the time the request 700 is received) and the second version of the tray 702 (e.g., the version to which to update the tray 702 according to the request 700). The changeset requested in the request 712 can be indicated by the tray management software 704 based on the version to which to update the tray 702 that is indicated in the request 700.

The source control system 710 can generate the changeset 714 responsive to receiving the request 712 from the tray management software 704. For example, the source control system 710 can identify the first and second versions of the tray within a source control repository (e.g., the source control repository 604 shown in FIG. 6) and perform a diffing or like operation to identify file differences between those versions. The results of the diffing or like operation may then be used to generate the changeset 714. The changeset 714 may then be transmitted from the source control system 710 to the tray management software 704.

Prior to updating the files of the tray 702 (e.g., one or both of the application 706 or the components 708) according to the changeset, the tray management software 704 can determine whether there are any pending requests preventing the updating of the tray 702 according to the changeset 714. For example, the tray management software 704 can include functionality for identifying other pending requests to process against the current version of the tray 702 installed on the server. For example, the tray management software 704 may maintain a log of requests it receives (e.g., from the management software of the server or other sources).

The tray management software 704 may further include functionality for determining whether any of the identified pending requests prevent the successful update of the current version of the tray 702 according to the changeset 714. For example, the tray management software 704 can determine whether a pending request is mutually exclusive with the request 700. The tray management software 704 can compare the changeset 714 to a changeset associated with the pending request. If the tray management software 704 determines responsive to that comparison that those changesets indicate changes made to the same file of the current version of the tray 702, the pending request can be determined to be mutually exclusive with the request 700. In another example, the tray management software 704 can determine whether the dependencies included in the components 708 of the current version of the tray 702 are compatible with the version to which to update the tray 702.

Responsive to determining that there are no pending requests preventing the updating of the tray 702 according to the changeset 714, the tray 702 can be updated from the first version to the second version. For example, the updating can include updating files in the tray 702 that are associated with data of the changeset 714.

Implementations of processing the request 700 of FIG. 7 can include additional, less, or combined functionality as compared to that described above, or functionality other than that described above, or combinations thereof. In some implementations, the request for the changeset 714 may be omitted responsive to the request 700. For example, the request 700 can be processed using a cache of the server on which the tray 702 is installed. The request 700 may be a request to revert the tray 702 from a second version to a first version. An earlier request may have been received by the tray management software 704 to update the tray from the first version to the second version. The changeset 716 retrieved by the tray management software 704 to process that earlier request may be stored in the cache of the server.

When the request 700 is later received, the tray management software 704 can determine that the cache stores the changeset 716. Alternatively, the server may include functionality for indicating that the cache stores the changeset 716 to the tray management software 704. The tray management software 704 can then determine that the changeset 716 stored in the cache includes the file differences needed to process the request 700. The tray management software 704 may thus retrieve the changeset 716 from the cache and use same to update the tray 702. Alternatively, the tray management software 704 can retrieve the changeset 716 from the cache and then determine that the changeset 716 includes the needed file differences.

In some implementations, the changeset 714 can be a reversion changeset. For example, a second version of the tray 702 may have been initially installed on the server, and a first request to update may have been a request to update the tray 702 to a third version. The request 700 may be a later request to update the tray 702 from the third version to a first version. The changeset used to update the tray 702 from the second version to the third version would thus not be usable to perform the update from the third version to the first version. As such, the tray management software 704 can request a reversion changeset including file differences between the third and first versions of the tray 702 from the source control system 710. The tray management software 704 may then update one or both of the application 706 or the components 708 according to the reversion changeset.

Figure 8:
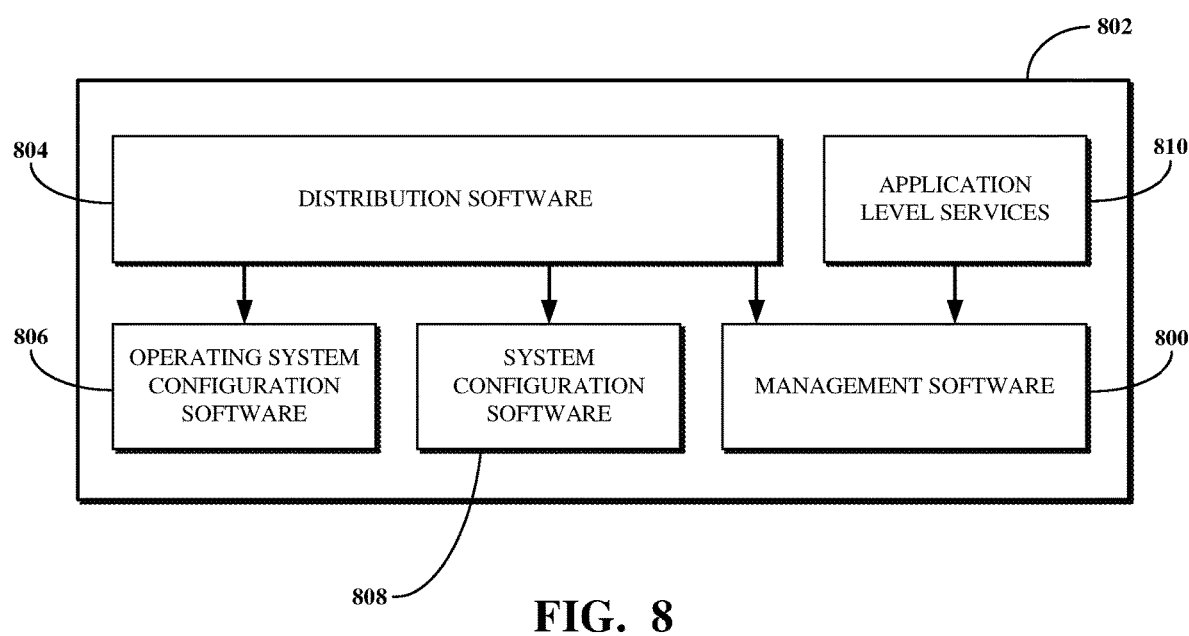
FIG. 8 is a block diagram of an example of a configuration of management software.

FIG. 8 is a block diagram of an example of a configuration of management software 800. The management software 800 can be, for example, the management software 506 shown in FIG. 5. The management software 800 is one of a plurality of software installed on a server 802, which, for example, can be the server 508 shown in FIG. 5. For example, the server 802 may include distribution software

804, operating system configuration software 806, system configuration software 808, and application level services 810.

The distribution software 804 can be software for defining a base image to use for applications, such as datacenter applications executed using trays installed on the server 802. The base image can include information used to configure an operating system of the server 802, other aspects of the system operating on the server 802, the management software 800, other software, or a combination thereof. The operating system configuration software 806 uses the base image from the distribution software 804 to perform operating system installation and configuration operations, such as to prepare the operating system for use on the server 802. The system configuration software uses a declarative language and information from the base image from the distribution software 804 to define system configurations for the server 802.

The application level services 810 includes information associated with applications that can be executed on the server 802. For example, the application level services 810 can include repositories for storing instructions to be included in trays for executing or otherwise interpreting applications, such as MySQL management software. The management software 800 receives data from the distribution software 804 and the application level services 810. As such, one or both of the distribution software 804 or the application level services 810 can be administrative software, such as the administrative software 502 shown in FIG. 5. Alternatively, the distribution software 804 can be the administrative software and the application level services 810 can be a source control system, such as the source control system 500 shown in FIG. 5.

Figure 9:
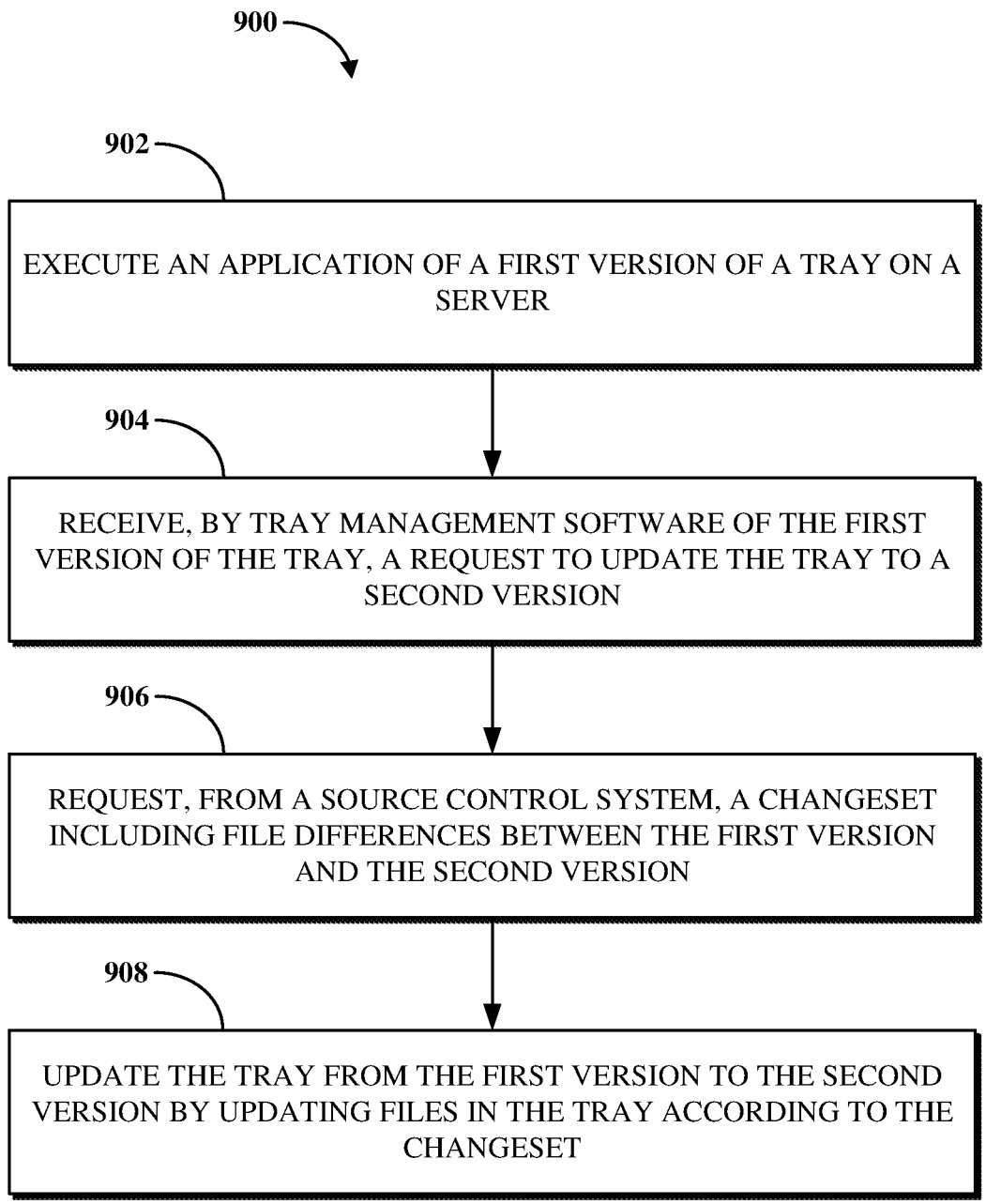
FIG. 9 is a flowchart illustrating an example of a technique for distributed incremental updating of trays using a source control system.

FIG. 9 is a flowchart illustrating an example of a technique 900 for distributed incremental updating of trays using a source control system. The technique 900 can be executed using computing devices, such as the systems, modules, and devices described with respect to FIGS. 1-8. The technique 900 can be performed, for example, by executing a machine-readable program or other computer-executable instructions, such as instructions or programs described according to JavaScript, C, or other such instructions. The steps, or operations, of the technique 900 or any other technique, method, process, or algorithm described in connection with the implementations disclosed herein can be implemented directly in hardware, firmware, software executed by hardware, circuitry, or a combination thereof.

In an implementation, the technique 900 includes executing an application of a first version of a tray via 902, receiving a request to update the tray to a second version via 904, requesting a changeset including file differences between the first and second versions via 906, and updating the tray according to the changeset via 908.

At 902, the application of a first version of a tray is executed on a server on which the tray is installed. Executing the application can include executing executable instructions, interpreting interpretable instructions, otherwise causing the application to run, or a combination thereof. The first version of the tray is installed on the server responsive to a request to install the tray thereon. The server can include management software that receives, generates, or otherwise identifies a request to install the first version of the tray on the server. For example, the management software can receive a command to install the first version of the tray from administrative software installed on the same or a different server.

The first version of the tray includes all dependencies needed for the application to execute within a computing environment. For example, the first version of the tray can include components associated with an operating system of the server onto which the first version of the tray is installed. For example, the application of the first version of the tray can be MySQL database software. The server can have a Linux® operating system installed thereon. The components of the first version of the tray can thus include dependencies used by the MySQL database software for executing within the Linux® operating system, such as Linux®-specific system libraries, tools, or the like. The first version of the tray is self-contained in that executing the application thereof does not require using any dependencies or other components not already included in the first version of the tray.

At 904, a request to update the first version of the tray to a second version is received by tray management software of the first version of the tray. The request to update the version of the tray is a request for a function of an API of the tray management software, where the function is to cause the tray to update using a changeset retrieved from a source control system. The request for the function of the API of the tray management software can be based on a command. For example, an administrator or like user of the server on which the first version of the tray is installed can input a command to request the update using a command-line terminal of a client having a network interface in communication with a network interface of the server. In another example, the command can be generated by a script automation running on the server.

At 906, responsive to receiving the request to update at 904, the tray management software can transmit a request for a changeset to a source control system (e.g., the source control system 500 shown in FIG. 5). The requested changeset is a changeset including one or more file differences between a current version of the tray (e.g., the first version of the tray) and a version to which to update the tray (e.g., the second version of the tray). The tray management software can generate the request for the changeset based on the request to update received at 904. For example, the tray management software can identify that the request received at 904 is a request to update the tray to the second version. The request for the changeset may thus be a request for a changeset associated with the first and second versions of the tray.

At 908, the tray is updated from the first version to the second version according to the changeset requested at 906. The updating to the second version of the tray can be responsive to a determination by the tray management software that there are no pending requests preventing the update. For example, the tray management software can identify other pending requests associated with the first version of the tray, such as within a log of requests received by the management software.

The tray management software may then determine whether any of the pending requests are mutually exclusive with the request received at 904. For example, the tray management software can compare the changeset requested at 906 to a changeset associated with one of the pending requests. If the tray management software determines responsive to that comparison that those changesets indicate changes made to the same file of the current version of the tray, the pending request can be determined to be mutually exclusive with the request. Alternatively, the tray management software can determine whether the dependencies included in the components of the first version of the tray are compatible with the second version of the tray.

Responsive to determining that there are no pending requests preventing the updating of the tray to the second version, the tray can be updated from the first version to the second version. For example, the updating can include updating files in the tray that are associated with data of the changeset according to the file differences included in the changeset.

Although the technique 900 is shown as a series of operations for clarity, implementations of the technique 900, or any other method, process, or algorithm described in connection with the implementations disclosed herein, can be performed in various orders or concurrently. Additionally, operations in accordance with this disclosure can be performed with other operations not presented and described herein. Furthermore, one or more aspects of the systems and techniques described herein can be omitted.

In some implementations, the technique 900 can include installing the first version of the tray on the server prior to executing the application of the first version of the tray at 902. For example, installing the first version of the tray on the server can include receiving instructions to install the first version of the tray on the server by the management software of the server. For example, a command to request the installation of the first version of the tray on the server can be transmitted from administrative software (e.g., the administrative software 502 shown in FIG. 5), such as responsive to a command received from a client terminal. For example, the request to install the first version of the tray on the server can be a request for a function of an API of the management software to retrieve the first version of the tray from a source control system and then install the retrieved first version of the tray on the server.

In some implementations, the technique 900 can include processing a request to revert the tray, such as from the second version back to the first version. For example, after the updating at 908, the tray management software can receive a request (e.g., for a function of an API of the tray management software) to revert the second version of the tray to the first version. The tray management software can use the changeset requested at 906 to revert the files in the second version of the tray to update the tray from the second version to the first version. The changeset can be retrieved from the source control system again. Alternatively, the changeset can be retrieved from a cache or other memory store of the server, such as which stores the changeset upon retrieving same from the source control server. In another example, the tray management software can request a different changeset, such as a reversion changeset, from the source control system. The tray management software can then update the tray from the second version to the first version according to the reversion changeset.

An implementation includes means for executing an application of a first version of a tray on a server, wherein the tray includes all dependencies needed for executing the application within a computing environment; means for receiving, by tray management software of the first version of the tray, a request to update the tray to a second version; means for requesting, from the source control system, a changeset including one or more file differences between the first version and the second version; and means for, responsive to a determination by the tray management software that there are no pending requests preventing an update, updating the tray from the first version to the second version by updating files in the tray according to the changeset.

An implementation includes means for receiving a request for a function of an API of tray management software, the tray management software included in a first version of a tray installed on a server; and means for executing the function against the tray to update the tray from the first version to a second version using a changeset retrieved from a source control system in communication with the server.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if each respective reference were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for distributed incremental updating of software containers, the system comprising:
   one or more processors; and
   a memory having instructions stored thereon, that when executed, are configured to cause the one or more processors to:
   execute an instance of an application of a first version of a software container on a server, wherein the software container includes software dependencies used to execute the instance of the application within a computing environment;
   receive, by a software container manager, a request to update the software container to a second version, wherein the request comprises a changeset from the first version to the second version;
   determine, by the software container manager, that there are no pending updates preventing an update from the first version to the second version, wherein the determination that there are no pending requests preventing the update is based on a determination by the software container manager that there are no other pending requests that indicate a potential change to a file of the software dependencies that differs from a corresponding potential change to the file in the second version;

determine that the software dependencies of the first version are compatible with the second version; and responsive to a determination by the software container manager that there are no pending requests preventing an update and that the software dependencies of the first version are compatible with the second version, update the software container from the first version to the second version by updating files in the software container according to the request.

2. The system of claim 1, wherein the instructions, when executed, are configured to cause the one or more processors:

receive, by software container manager prior to executing the instance, a command from a client terminal, wherein the command instructs the software container manager to install the first version of the software container; and retrieve the first version of the software container from a version repository responsive to the command.

3. The system of claim 1, wherein the instructions, when executed, are configured to cause the one or more processors:

receive a request to revert the software container to the first version from the second version; and update the software container from the second version to the first version by reverting files in the software container based on the changeset.

4. The system of claim 1, wherein the memory further includes instructions executable by the one or more processors to:

receive a request to revert the software container to the first version from the second version;

request a reversion changeset including one or more file differences between the second version and the first version; and update the software container from the second version to the first version by updating files in the software container according to the reversion changeset.

5. The system of claim 1, wherein the request to update the software container to the second version is responsive to a change in a version of a configuration item associated with the server.

6. The system of claim 1, wherein the request to update the software container to the second version is a request to update the software container to a current version of the software container stored as a head version of the software container.

7. The system of claim 6, wherein receiving the changeset comprises requesting the changeset having one or more file differences between the first version and the head version.

8. A method for distributed incremental updating of software containers, the method comprising:

executing an instance of an application of a first version of a software container on an application server, wherein the software container includes software dependencies used to execute the instance of the application within a computing environment;

receiving a request to update the software container to a second version;

determining that no pending updates are preventing an update from the first version to the second version, wherein determining that no pending updates are preventing the update based at least in part on no changesets of file differences for the pending updates and the second version indicating different changes to occur to a file for the second version and the pending updates; and responsive to a determination that the software dependencies of the pending updates are preventing the update to the second version, blocking the update to the second version or to the one or more pending updates.

9. The method of claim 8, comprising:

receiving, by management software of the application server before executing the instance, a command to install the first version of the software container on the application server; and retrieving the first version of the software container responsive to the command.

10. The method of claim 9, wherein receiving the command comprises receiving the command from a client terminal.

11. The method of claim 8, comprising:

receiving a request to revert the software container to the first version; and updating the software container from the second version to the first version by reverting files in the software container based at least in part on a reversion changeset previously used to update the first version to the second version.

12. The method of claim 8, comprising:

receiving a request to revert the software container to the first version;

requesting a reversion changeset including one or more file differences between the second version or the third version and the first version; and updating the software container from the second version or the third version to the first version by updating files in the software container according to the reversion changeset.

13. The method of claim 8, wherein the request to update the software container to the second version is responsive to a change in a version of a configuration item associated with the application server.

14. The method of claim 8, wherein the request to update the software container to the second version is a request to update a parent version of the software container from the first version to the second version.

15. The method of claim 8, wherein the request to update the software container to the second version is a request to update a child version of the software container from the first version to the second version.

16. A tangible, non-transitory, and computer-readable storage medium having stored thereon instructions, that when executed by one or more processors, causes the one or more processors to:

receive a request for a function of an application programming interface (API) of software container manager, the software container manager included in a first version of a software container installed on an application server of a cloud platform, wherein the software container includes an executable file and software dependencies used to execute the executable file;

execute the function to cause the software container to initiate a request to update the software container from a first version to a second version using a changeset, wherein the changeset includes file differences between the first version and the second version;

determining whether the software dependencies of the second version are compatible with any pending update requests based at least in part on the changeset, wherein determining whether the software dependencies of the second version are compatible with pending update requests is based on a determination of whether the no pending update requests are preventing the update, wherein the determination is based at least in part on no pending update requests preventing the update from the first version to the second version due to any of the pending update requests changing any file differently than second version changes from the first version in the update;

in response to determining that the software dependencies of the second version are compatible with the pending update requests and that no pending update requests are preventing the update from the first version to the second version, complete the update of the software container from the first version to the second version; and in response to determining that the software dependencies of the second version are incompatible with the pending update requests or that any pending update requests are preventing the update from the first version to the second version, blocking the update to the second version or blocking at least one of the other pending update requests.

17. The tangible, non-transitory, and computer-readable storage medium of claim 16, wherein the instructions, when executed, are configured to cause the one or more processors to update the software container from the second version to the first version responsive to a request to revert the software container to the first version.

* * * * *